US008046750B2

(12) United States Patent
Ramsey et al.

(10) Patent No.: US 8,046,750 B2
(45) Date of Patent: Oct. 25, 2011

(54) DISCO: A SIMPLIFIED DISTRIBUTED COMPUTING LIBRARY

(75) Inventors: William D Ramsey, Redmond, WA (US); Ronnie I Chaiken, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1168 days.

(21) Appl. No.: 11/762,246

(22) Filed: Jun. 13, 2007

(65) Prior Publication Data

US 2008/0313625 A1 Dec. 18, 2008

(51) Int. Cl.
G06F 9/44 (2006.01)
(52) U.S. Cl. ........ 717/149; 717/139; 717/155; 717/159; 717/163
(58) Field of Classification Search .................. None
See application file for complete search history.

(56) References Cited

U.S. PATENT DOCUMENTS

| | | | |
|---|---|---|---|
| 4,769,772 A | 9/1988 | Dwyer | |
| 4,811,207 A | 3/1989 | Hikita et al. | |
| 5,210,870 A | 5/1993 | Baum et al. | |
| 5,535,393 A * | 7/1996 | Reeve et al. | 717/149 |
| 5,710,927 A * | 1/1998 | Robison | 717/155 |
| 5,712,996 A * | 1/1998 | Schepers | 712/216 |
| 5,794,046 A * | 8/1998 | Meier et al. | 717/128 |
| 5,828,886 A * | 10/1998 | Hayashi | 717/159 |
| 5,983,019 A * | 11/1999 | Davidson | 717/139 |
| 6,026,394 A | 2/2000 | Tsuchida et al. | |
| 6,226,649 B1 | 5/2001 | Bodamer et al. | |
| 6,282,703 B1 * | 8/2001 | Meth et al. | 717/163 |
| 6,847,970 B2 | 1/2005 | Keller et al. | |
| 6,978,458 B1 | 12/2005 | Ghosh et al. | |
| 7,003,781 B1 | 2/2006 | Blackwell et al. | |
| 7,054,852 B1 | 5/2006 | Cohen | |
| 7,194,734 B2 * | 3/2007 | Hoogerbrugge et al. | 717/139 |
| 7,243,345 B2 * | 7/2007 | Ohsawa et al. | 717/149 |
| 7,257,807 B2 * | 8/2007 | Nikitin et al. | 717/152 |
| 7,810,084 B2 * | 10/2010 | Egetoft | 717/149 |
| 7,840,585 B2 * | 11/2010 | Ramsey et al. | 707/764 |
| 7,861,222 B2 * | 12/2010 | Ramsey et al. | 717/115 |
| 2004/0049565 A1 | 3/2004 | Keller et al. | |
| 2005/0066321 A1 * | 3/2005 | Nikitin et al. | 717/149 |
| 2005/0204023 A1 | 9/2005 | Bjorg | |

FOREIGN PATENT DOCUMENTS

EP 1550951 A2 7/2005
WO WO2005076160 A1 8/2005

OTHER PUBLICATIONS

"Software Process Development and Enactment Concepts and Definitions", Peter H. Feile et al., 1993, pp. 28-40, <http://ieeexplore.ieee.org/stamp/stamp.jsp?tp=&arnumber=236824>.*

(Continued)

*Primary Examiner* — Thuy Dao
*Assistant Examiner* — Ziaul Chowdhury

(57) ABSTRACT

Core commands and aggregations of such commands are provided to programmers to enable them to generate programs that can be parallel-processed without requiring the programmer to be aware of parallel-processing techniques. The core commands and aggregations abstract mechanisms that can be executed in parallel, enabling the programmer to focus on higher-level concepts. The core commands provided include commands for applying a function in parallel and distributing and joining data in parallel. The output of each core command can implement an interface that can enable underlying mechanisms to stitch together multiple core commands in a cohesive manner to perform more complex actions.

20 Claims, 10 Drawing Sheets

OTHER PUBLICATIONS

"Bridging the Gap between Data Warehouses and Business Processes", Veronika Stefanov et al., 2005, pp. 1-12, <http://citeseerx.ist.psu.edu/viewdoc/download?doi=10.1.1.68.4456&rep=rep1&type=pdf>.*

"Compactly Encoding Unstructured Inputs with Differential Compression", Miklos Ajtai et al.,2002, pp. 318-367, <http://delivery.acm.org/10.1145/570000/567116/p318-ajtai.pdf>.*

"A Simple Framework to Generate Parallel Application for Geospatial Processing", Helen Coullon et al., 2010, pp. 1-4, <http://delivery.acm.org/10.1145/1830000/1823891/a32-coullon.pdf>.*

Smith, "Analyzing Large Data Sets with S-PLUS 7 Enterprise Developer", Insightful Corporation, 2005, pp. 1-36.

Abadi, et al., "Aurora: A New Model and Architecture for Data Stream Management",vol. 12, Issue 2, Spring-verlag, 2003, pp. 1-20.

* cited by examiner

900

910

```
static public void ComputeNGrams(StreamReader reader, StreamWriter
                                              writer, string[] args)
{
    int num = args.Length > 0 ? System.Convert.ToInt32(args[0]) : 2;

string line;
    while ((line = reader.ReadLine()) != null)
    {
        string[] tokens = line.ToLower().Split(' ');
        for (int i = 0; i < tokens.Length - num + 1; ++i)
        {
            string ngram = tokens[i];
            for (int j = 1; j < num; ++j)
            {
                ngram += " " + tokens[i + j];
            }
            writer.WriteLine(ngram);
        }
    }
}
```

920

```
static public void Count(StreamReader reader, StreamWriter writer,
                                              string[] args)
{
    string line = reader.ReadLine();
    string previous = line;
    int count = 1;
    while ((line = reader.ReadLine()) != null)
    {
        //refine logic here
        if (line != previous)
        {
            writer.WriteLine(previous + "\t" + count);
            previous = line;
            count = 1;
        }
        else
        {
            ++count;
        }
    }
            if (previous != null)
    {
        writer.WriteLine(previous + "\t" + count);
            }
}
```

Figure 10

DISCO: A SIMPLIFIED DISTRIBUTED COMPUTING LIBRARY

BACKGROUND

Because of the increasingly interconnected nature of computing devices throughout the world, the data gathered and generated by those computing devices has grown at an exponential rate. The time to process such increasing amounts of data, using traditional methodologies, will, therefore, exponentially increase as well. For businesses, educational and governmental institutions, and others who provide or consume services derived from billions of individual data points, the management of such a large amount of data in an efficient manner becomes crucial. Thus, as the amount of data being gathered and generated increases, the infrastructure for storing, managing, and operating on such data needs to expand as well.

Traditionally, large quantities of data were efficiently handled using fault-tolerant storage systems and parallel-processing algorithms. Fault-tolerant storage systems enabled large quantities of data to be stored across hundreds or even thousands of inexpensive storage media, despite the risks that at least one of these storage media would fail, rendering the data stored on it inaccessible. Parallel-processing, or algorithms enabled large quantities of data to be efficiently gathered and processed by simply dividing the necessary labor across inexpensive processing equipment, such as the multi-core microprocessors present in modern computing hardware.

However, while fault-tolerant storage systems can be implemented in a generic fashion, such that a single fault-tolerant storage algorithm can be used to store any type of information, parallel-processing algorithms are, by their nature, specific to the particular problem that they seek to solve or the particular task that they seek to accomplish. Thus, a search engine can use the same fault-tolerant storage mechanisms as a weather prediction engine, but, obviously, they would each rely on vastly different parallel-processing algorithms.

SUMMARY

Generating the necessary computing instructions to perform parallel-processing can be a daunting task, even for experienced programmers. For example, to generate an algorithm that can take advantage of parallel-processing, programmers must, among other things, take into account a continuously varying number of independent processes, must identify and divide out those aspects of their algorithms that can be performed in parallel, and must account for the communication of information across processes boundaries. In one embodiment, therefore, programmers are provided improved mechanisms for generating algorithms that can benefit from parallel-processing, including the provision of several core commands optimized for parallel-processing that can be used without any advanced knowledge of parallel-processing methodologies. Such core commands can be based on operations that are commonly used in parallel, or distributed, computations, such as the partitioning of data into collections, or "buckets," the aggregating of parallel outputs, the processing of data in parallel, and the joining of two parallel outputs.

One core command can accept, as input, a function that the programmer wishes to have executed across multiple processes, or processors, in parallel. The underlying mechanisms supporting such a command can then distribute the function in a known manner, thereby enabling the programmer to take advantage of parallel processing efficiencies without writing anything more complicated than a statement invoking this core command and providing to it the function to be distributed. Another core command can process data, specified by the programmer, in parallel, such that each process divides its portion of the data into a specified number of sub-divisions. A further core command can aggregate multiple data segments from multiple, independent, parallel processes into one or more collections. The combination of the core command dividing data followed by the core command aggregating data results in a mapping operation that is often used in parallel-processing.

In addition to aggregating the data from multiple processes, further core commands can be provided for merging data from multiple processes including, joining data from multiple processes and performing a cross-product on data from multiple processes. The core command for joining data can result in the merging of data that is output by two prior operations, each of which had the same number of outputs, such that the first output of the former operation is joined with the first output of the latter operation, the second output of the former operation is joined with the second output of the latter operation, and continuing in such a manner for the remaining outputs of the former and latter operations. The join core command, therefore, can result in the same number of outputs as the two prior operations whose outputs are being joined. Alternatively, the core command for performing a cross-product can result in the merging of data that is output by two prior operations such that the first output of the former operation is joined, successively, with each of the outputs of the latter operation, the second output of the former operation is joined, successively, with each of the outputs of the latter operation, and continuing in such a manner for the remaining outputs of the former operation. Thus, the number of outputs of the cross-product core command can be equal to the product of the number of outputs of the former command and the number of outputs of the latter command.

In a further embodiment, given the above described core commands, abstractions can be provided to enable a programmer to easily perform common tasks. For example, a commonly performed sorting operation can be provided as an abstraction of the above described core command that applies a specified function to collections of data independently across multiple processes. In the case of the sorting abstraction, the specified function can be a storing function. Alternatively, an abstraction can be a combination of two or more core commands, together performing a common operation. For example, as indicated, the combination of the core command dividing data followed by the core command aggregating data can result in the often-used mapping operation. Thus, a mapping abstraction can provide, for a programmer, a single mechanism to use, abstracting the details of calling each core command individually.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which:

FIG. 10 is a code diagram illustrating delegates used in FIG. 9.

DETAILED DESCRIPTION

The following description relates to the provision of core commands that enable a programmer to utilize parallel-processing techniques without advanced knowledge of such techniques. Each core command enables a programmer to perform an operation across one or more processes independently, and in parallel. The programmer, therefore, need only invoke one or more of the core commands and their code will be capable of being parallel-processed. Additional abstractions, based upon the core commands, can be provided to enable a programmer to efficiently perform common tasks. Some abstractions can be a single core command utilized in a particular manner, or with a particular input, while other abstractions can comprise two or more core commands utilized in a particular order.

The techniques described herein focus on, but are not limited to, the provision of core commands providing access to parallel-processing mechanisms in the context of the C# programming language. None of the embodiments described below, however, utilize any aspect of the C# programming language that could not be found in a myriad of other higher level programming languages, such as Visual Basic® or C++. Consequently, while the specific examples provided below are written for C#, the descriptions provided herein are not intended to be so limited.

Figure 1:
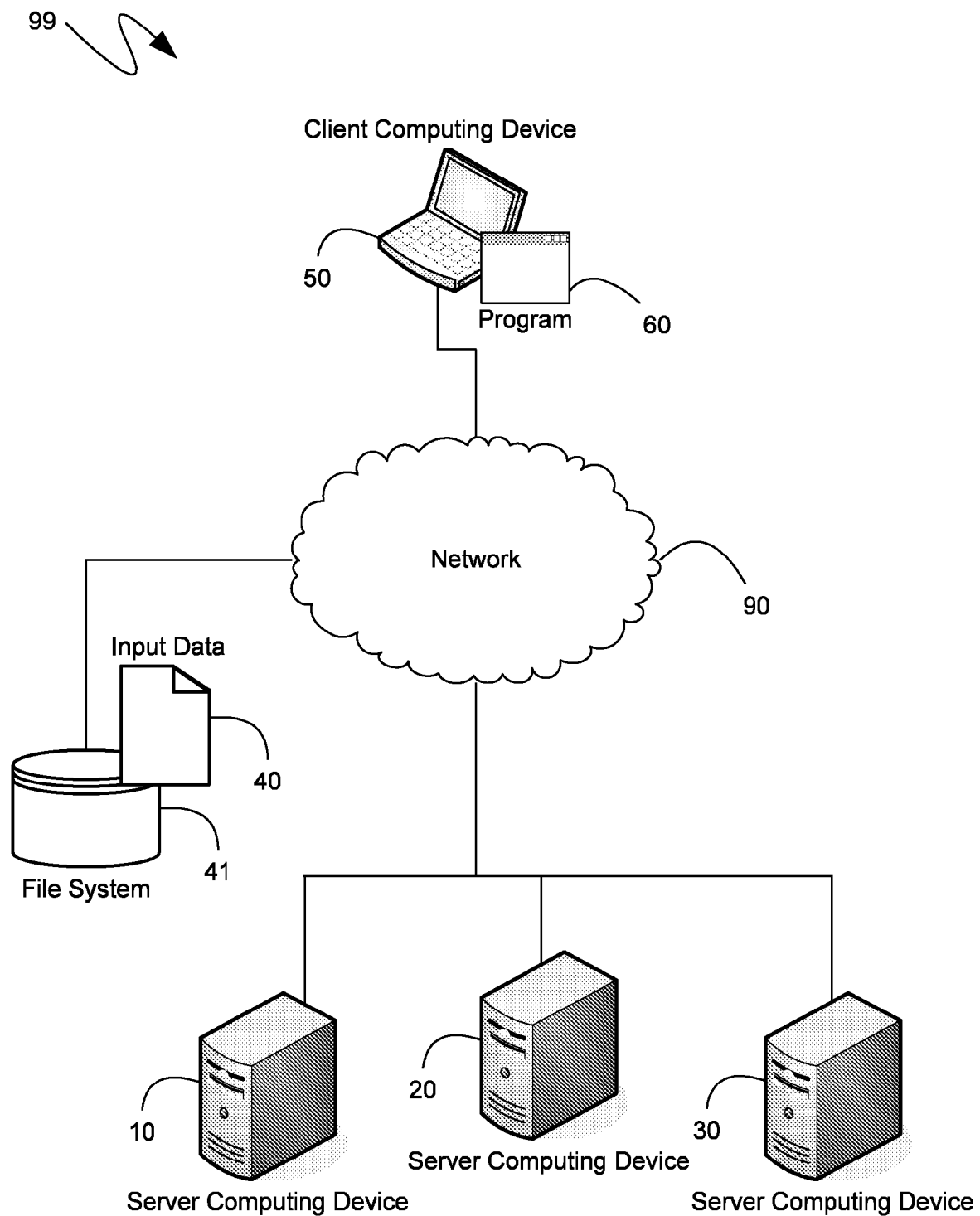
FIG. 1 is a block diagram of an exemplary network comprising multiple interconnected devices, some of which can perform operations in parallel.

Turning to FIG. 1, an exemplary network system 99 is illustrated comprising the network 90 itself, a client computing device 50, a file system 41, and multiple server computing devices, such as server computing devices 10, 20 and 30, all connected to the network 90. The file system 41 can be local to the client computing device 50, one of the server computing devices 10, 20 or 30, or some other computing device, or it can be distributed among multiple computing devices such as computing devices 10, 20, 30 or 50. The file system 41 can comprise one or more files that can act as input data 40 to a program 60, illustrated as being resident on the client computing device 50.

In one embodiment, the input data 40 can comprise a very large amount of data such that the processing of such data can be prohibitively slow if performed by only a single computing device or a single process within a computing device capable of hosting multiple simultaneous processes. For example, if the input data 40 comprised several hundred terabytes of data, the processing of such data using a single computing device could take days or even weeks to complete. To process data of such size within a reasonable period of time, multiple computing devices, each of which can host one or more independent processes, can independently, and in parallel, process some segment of the input data 40, thereby decreasing the processing time by a factor proportional to the number of independent processes operating in parallel.

Modern server computing devices often comprise multiple processors capable of executing multiple simultaneous processes. Furthermore, virtual machine technologies often enable such server computing devices to execute more processes in parallel than the physical number of processors installed. However, for simplicity of illustration and description only, and not because of any inherent limitation in the mechanisms described, the descriptions below will proceed as if the server computing devices 10, 20 and 30 comprise a single processor capable of simultaneously executing a single process.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
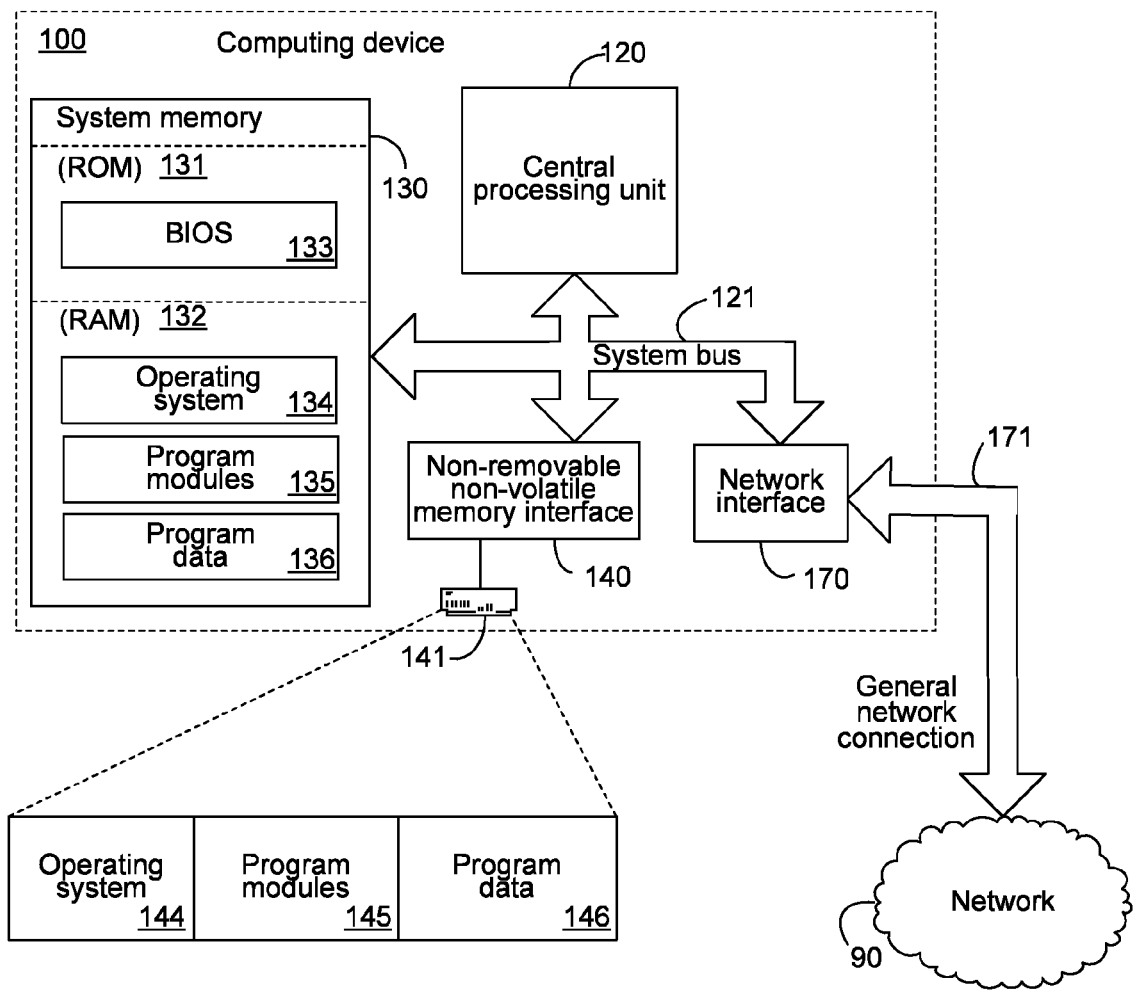
FIG. 2 is a block diagram of an exemplary computing device.

With reference to FIG. 2, an exemplary computing device 100 is illustrated. The computing device 100 can represent any of the computing devices 10, 20, 30 or 50 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Irrespective of the specific network connections and communicational protocols used, however, so long as the computing device 50 can communicate with the server computing devices 10, 20 and 30 in an appropriate manner, the computing device can use the server computing devices to execute, in parallel, the program 60, which can perform functions directed to the input data 40. To enable easier creation of the program 60, core commands can be provided which enable a programmer to utilize the parallel processing capabilities provided by, for example, the server computing devices 10, 20 and 30, without requiring the programmer to possess the skills typically required to generate parallel-processing code. The core commands can be utilized as any other command of a higher level programming language, except that such commands can, instead of generating instructions for execution on a single processor, can generate the appropriate instructions necessary for proper execution on multiple, parallel processors.

One such core command can enable a programmer to apply a function to data in parallel, thereby potentially dramatically decreasing the time required to perform the function, as compared to a serial execution of the function. For example, if the programmer wanted to identify each web page that used a particular word, from among a collection of several billion web pages, the searching function written by the programmer could be executed by several thousand individual processors operating in parallel, using the function to search only a few thousand web pages. The web pages would then be searched several thousand times faster than if a single processor executed the same function to search all several billion web pages by itself.

Figure 3:
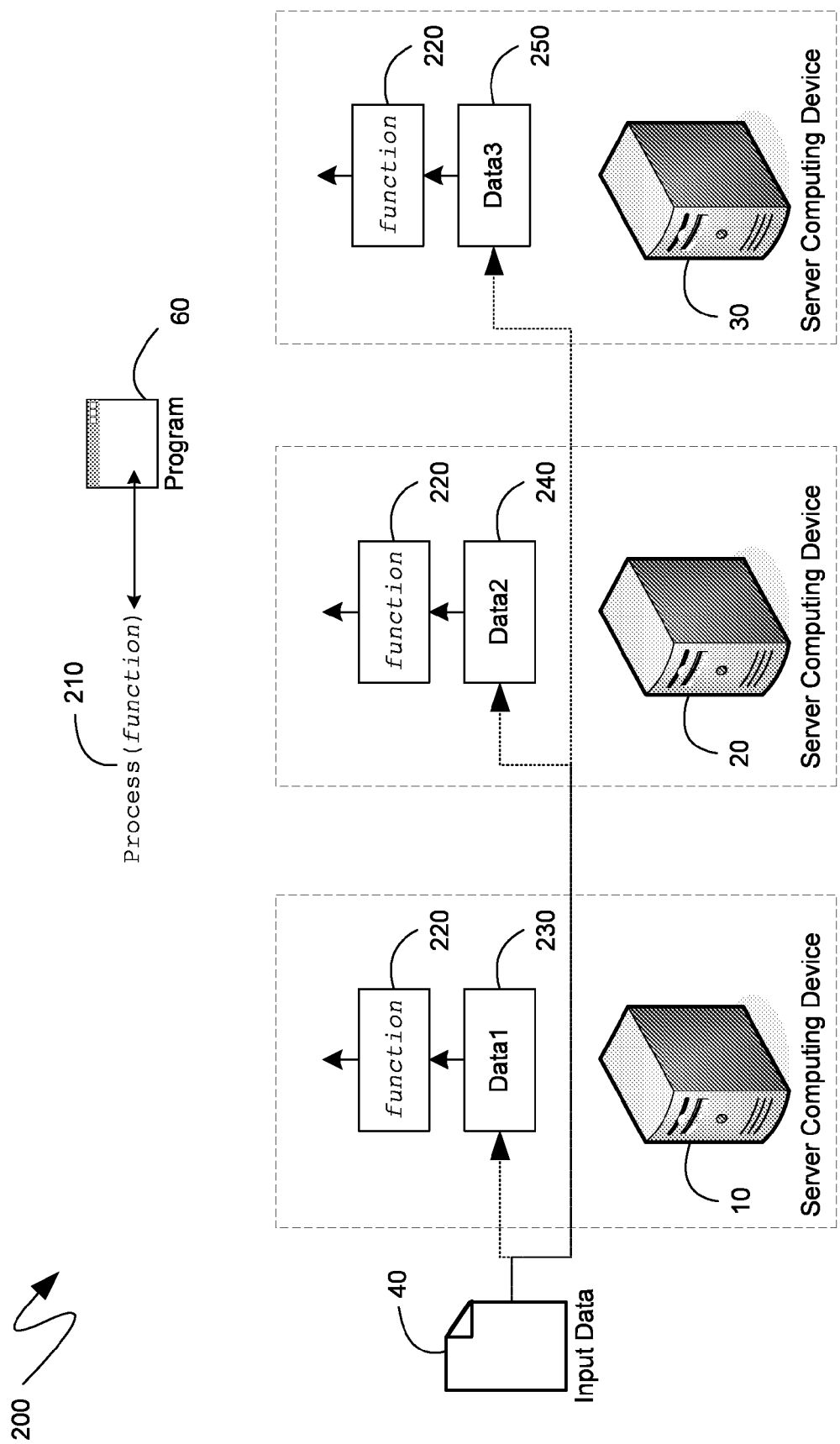
FIG. 3 is a block diagram of a "process" core command.

Turning to FIG. 3, such a core command, referred to hereinafter as the "process" command is illustrated with respect to the functional diagram 200. The use of the process command 210 within the program 60 can enable the performance of the operations illustrated with respect to the server computing devices 10, 20 and 30. Specifically, a programmer can specify a function to be provided as input to the process command 210. The process command 210 can then apply that function in parallel across multiple processes. For example, as shown in FIG. 3, if the function specified by the programmer performed some action with respect to the input data 40, the data could be partitioned into data segments 230, 240 and 250 across server computing devices 10, 20 and 30 and each data segment could then be acted upon by the specified function 220 in parallel as shown.

In one embodiment, the function 220 can conform to a particular format so as to more effectively be used with the process command 210. Such a function will be referred to hereinafter as a "process delegate" and can read from a single input and write to a single output. For example, a process delegate can be of the form shown in Table 1, below, where the reading is performed by a reader belonging to the well-known class StreamReader and the writing is performed by a writer belonging to the well-known class StreamWriter.

TABLE 1

| | |
|---|---|
| public | delegate void ProcessDelegate (<br>StreamReader reader,<br>StreamWriter writer,<br>string [ ] args) ; |

For simplicity, the process command 210 is illustrated in FIG. 3 as accepting a single parameter, namely the specification of the function 220 that is the process delegate. However, to provide appropriate flexibility, the process command 210, in addition to accepting the specification of the process delegate, can further accept inputs that can pass arguments to the process delegate, if the process delegate was written by the programmer to look for such inputs, and can further accept a specification of the data to be read by the writer specified in the process delegate. In one embodiment, the process command 210 can take the form shown in Table 2, below, where the data to be read by the process delegate is obtained from a prior command that output an object implementing an IScriptCommand interface, in the manner described in detail below. In an alternative embodiment, the process command 210 can take the form shown in Table 3, also below, where the data to be read by the process delegate is obtained from a file. Optimally, the file can be of a format wherein multiple segments of the file can be read simultaneously by multiple processes.

TABLE 2

| | |
|---|---|
| public | ProcessScriptCommand Process (<br>ProcessDelegate del,<br>IScriptCommand dependency,<br>string args) |

TABLE 3

| | |
|---|---|
| public | ProcessScriptCommand Process (<br>ProcessDelegate del,<br>string cosmosFileName,<br>string args) |

The process command 210, along with the other core commands to be described further below, can output objects that can implement an interface to enable and facilitate the linking of two or more core commands in a useful manner. Specifically, the object output by one core command can be used as the input to a subsequent core command. Consequently, the interface implemented by objects output by the described core commands can enable the specification of information relevant to such a transition between core commands. In one embodiment, such information can include a description of how the object should be run, how previous dependencies can be connected to, and what resources may be required. In addition, the interface can further enable the specification of an identifier by which the object can be uniquely referred, a variable name, and the number of independent processes that the relevant core command can be executed on in parallel.

Table 4, below, illustrates an IScriptCommand interface which, in one embodiment, can be implemented by the objects output by the core commands described herein. As shown, the IScriptCommand interface provides an identifier, in the form of a string, a variable name, also in the form of a string, and a method, named "GenerateAlgebra," that enables the object exporting this interface to describe how it is to be run, including the specification of connections to previous dependencies and the specification of resources that may be required to launch the command.

TABLE 4

| |
|---|
| public interface IScriptCommand<br>{<br>  string ID { get; }<br>  void GenerateAlgebra (<br>    StreamWriter writer,<br>    List<string> resources,<br>    List<string> tempFiles) ;<br>  int Outputs { get; }<br>  string VariableName { get; set; }<br>} |

Because the process core command 210 provides programmers with the ability to process, in parallel, a wide variety of functions that can be written by the programmers themselves to suit their particular needs, the process command can be very versatile. However, there exist several often-used functions, especially within the field of data processing, that can be provided to a programmer to avoid forcing each programmer to independently write their own versions when such customization is not necessary. Thus, additional core functions are contemplated that provide programmers simplified access to more commonly used data processing functions.

One such core command can enable the division, in parallel, of multiple segments of data into subdivisions according to one or more criteria that can be specified by a programmer. Such a core command, hereinafter referred to as the "distribute" command, is illustrated by the functional diagram 300 of FIG. 4. As shown, the use of the distribute command 310 in the program 60, together with a specification of a value, represented by the variable "N" in FIG. 4, enables a programmer to divide sections of data, in parallel, into as many subdivisions as specified by the value "N." For example, input data 40 can be distributed among multiple different processes operating in parallel, such as represented by the individual server computing devices 10, 20 and 30. Each distribution of data 230, 240 and 250 can then be divided into subdivisions 320, 330 and 340 by the server computing devices 10, 20 and 30, respectively, in parallel.

Figure 4:
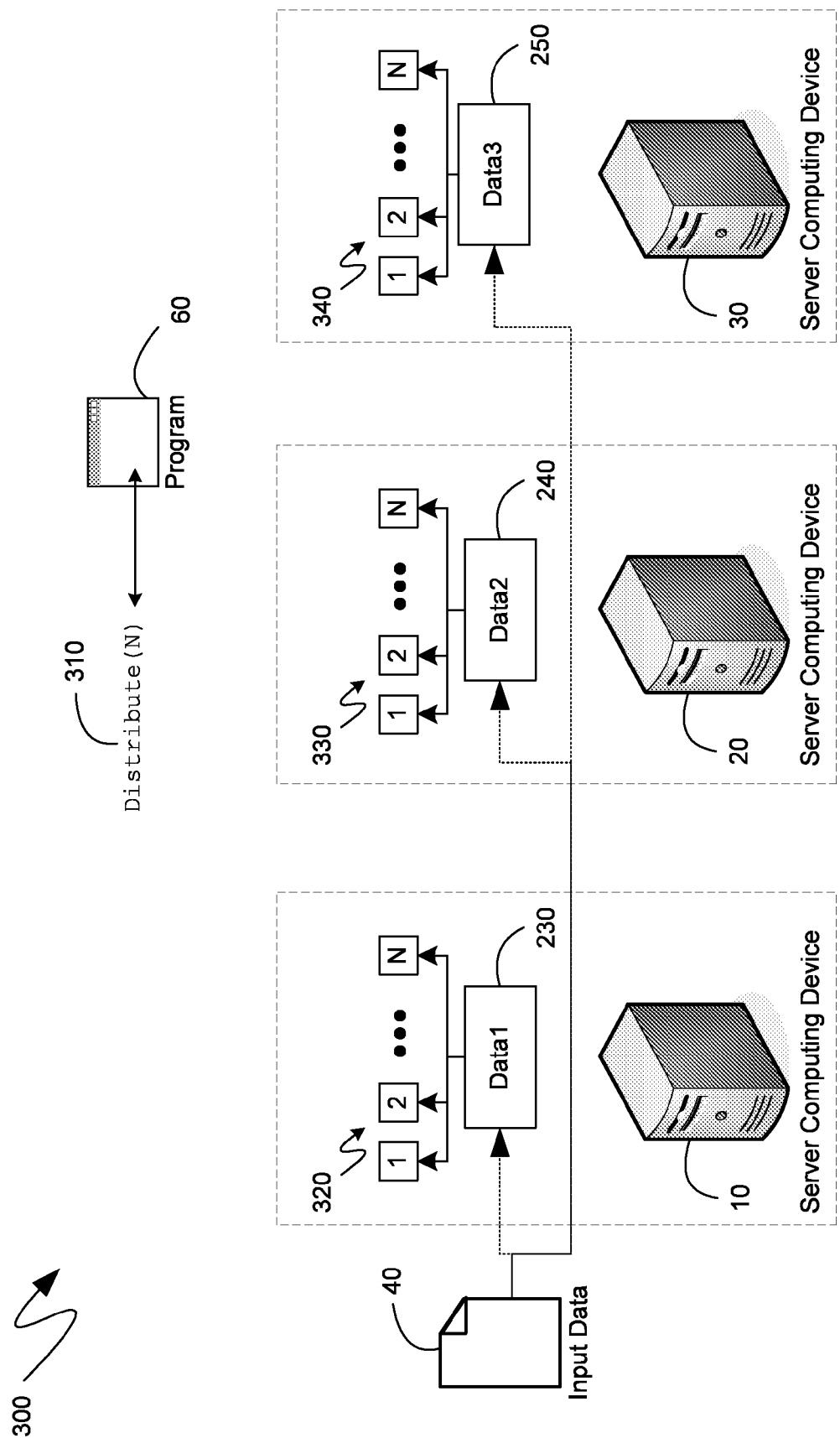
FIG. 4 is a block diagram of a "distribute" core command.

The distribute command 310 shown in FIG. 4, for simplicity of illustration, indicates only a single parameter, namely the specification of the number of subdivisions. However, to provide further flexibility, the distribute command can be of a number of different forms, including forms that enable a programmer to specify a "distribute delegate" to perform each of the divisions, and forms that enable a programmer to specify the data to be divided.

In one embodiment, the form of the distribute command 310 can be as illustrated by Table 5, below. As shown, such a form can provide for the specification of a file that comprises the data to be divided, in addition to the specification of the number of subdivisions (termed "buckets" in Table 5) and the specification of arguments that can be provided to the distribute command 310. In an alternative embodiment, the distribute command 310 can be of the form illustrated by Table 6, below, which instead of providing for the specification of a file, as in the form of Table 5, instead provides for the specification of an object output by a prior core command, via the IScriptCommand exported by such an object. In a further alternative embodiment, the distribute command 310 can be of a form that provides for the specification of a distribute delegate, such as the forms illustrated by Tables 7 and 8, also below. The forms illustrated in Tables 7 and 8 mirror those illustrated in Tables 5 and 6, and described above, with the exception that the forms of Tables 7 and 8 further provide for the specification of a distribute delegate.

TABLE 5

```
public DistributeScriptCommand Distribute (
    string cosmosFileName,
    int buckets,
    string args)
```

TABLE 6

```
public DistributeScriptCommand Distribute (
    IScriptCommand dependency,
    int buckets,
    string args)
```

TABLE 7

```
public DistributeScriptCommand Distribute (
    DistributeDelegate del,
    string cosmosFileName,
    int buckets,
    string args)
```

TABLE 8

```
public DistributeScriptCommand Distribute (
    DistributeDelegate del,
    IScriptCommand dependency,
    int buckets,
    string args)
```

As with the process delegate described above, a distribute delegate can be a customized function that can be written by a programmer to be executed in parallel as part of the distribute core command described above. More specifically, the distribute delegate can enable a programmer to describe, with specificity, exactly how the data is to be divided by each process. In one embodiment, the distribute delegate can take the form illustrated in Table 9, below, which provides for the specification of a mechanism to read the data to be divided, the specification of one or more mechanisms to write the data into the subdivisions, and the specification of one or more arguments that can be provided. The mechanism for reading the data can be of the StreamReader class, while the mechanisms for writing the data can each be instances of the StreamWriter class.

TABLE 9

```
public delegate void DistributeDelegate (
    StreamReader reader,
    List<StreamWriter> writers,
    string[ ] args) ;
```

Figure 5:
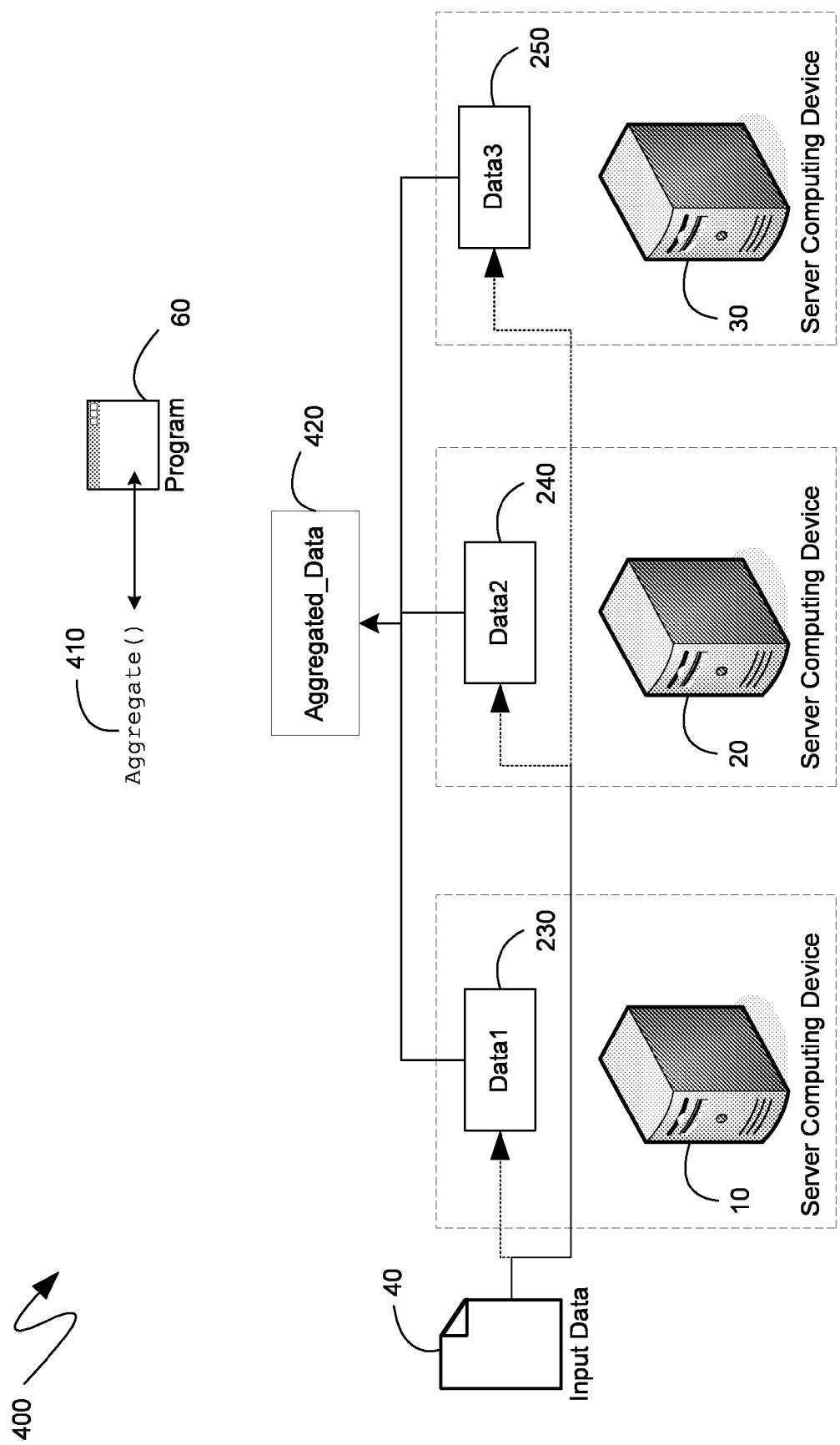
FIG. 5 is a block diagram of an "aggregate" core command.

In addition to dividing data into subsections, another operation common in the data processing field is the aggregation of two or more independent collections of data into a single data collection. Thus, another core command that can provide programmers with simplified access to commonly used commands is the "aggregate" core command, whose operation, in one embodiment, is illustrated by the functional diagram 400 of FIG. 5. As shown, the aggregate command 410, when used in program 60, can cause the server computing devices 10, 20 and 30, each having access to data segments 230, 240 and 250, respectively, to combine each of those data segments into a single data collection 420.

In one embodiment, the aggregate command 410 can combine data segments from multiple processes, such as data segments 230, 240 and 250, in a default manner. Consequently, a programmer need only specify which data to combine and any augments that are to be passed in to the default function, if appropriate. The form of such an aggregate command 410 is illustrated in Table 10, below, when the IScriptCommand references the objects output by a prior core command that are to be combined by the aggregate command. In an alternative embodiment, the aggregate command 410 can provide for a programmer to specify a particular method by which the data is to be combined, through the use of an "aggregate delegate" that can be written by the programmer. The form of this alternative aggregate command 410 is illustrated in Table 11, below. As can be seen, the aggregate command form of Table 11 mirrors that of Table 10, with the addition of the specification of an aggregate delegate.

TABLE 10

```
public AggregateScriptCommand Aggregate (
    IScriptCommand dependency,
    string args)
```

TABLE 11

```
public AggregateScriptCommand Aggregate (
    AggregateDelegate del,
    IScriptCommand dependency,
    string args)
```

The aggregate delegate can, in a manner analogous to the distribute delegate described above, specify multiple inputs, a single output, and any arguments that may be appropriate. The form of such as aggregate delegate can conform to the example illustrated in Table 12, below, where the multiple inputs are shown as multiple instances of the StreamReader class and the output is shown as an instance of the StreamWriter class.

TABLE 12

```
public delegate void AggregateDelegate (
    List<StreamReader> readers,
    StreamWriter writer,
    string [ ] args) ;
```

Figure 6:
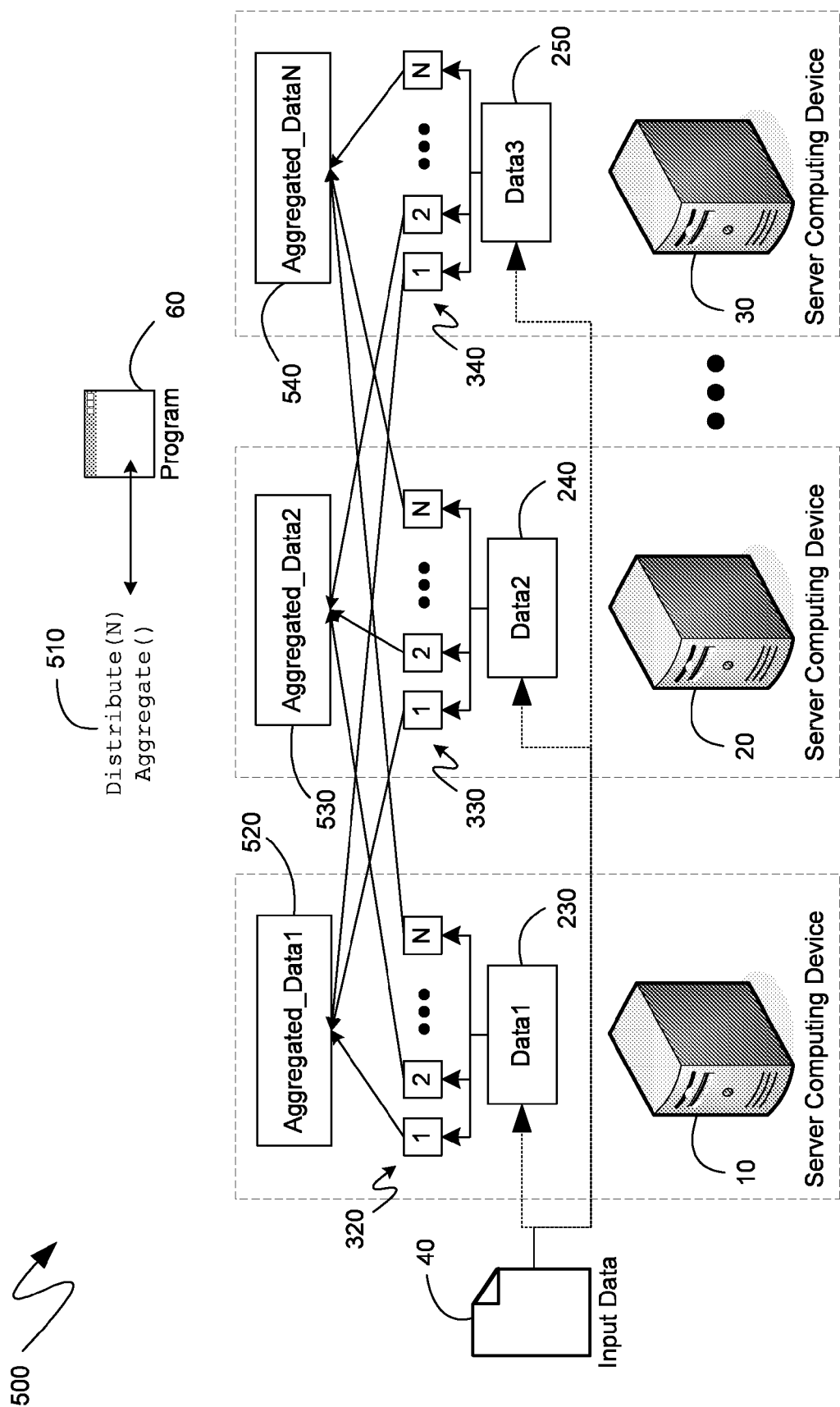
FIG. 6 is a block diagram of an "aggregate" core command when performed after a "distribute" core command.

In an alternative embodiment, the aggregate command 410 can perform a slightly different default function when it is used in combination with the previously described distribute command 310. Turning to FIG. 6, a functional diagram 500 is shown illustrating the operation of the distribute and aggregate commands when used together. Specifically, the combination of the distribute and aggregate commands 510 in program 60 can cause the data segments 230, 240 and 250, handled in parallel by the server computing devices 10, 20 and 30, respectively, to initially be divided into subdivisions 320, 330 and 340, respectively, and then subsequently aggregated into data collections 520, 530 and 540, respectively. Specifically, the subdivisions 320, 330 and 340 are aggregated by aggregating the first subdivision of subdivision 320 with the first subdivision of subdivisions 330 and 340 into the first aggregated data collection 520, by aggregating the second subdivision of subdivision 320 with the second subdivision of subdivisions 330 and 340 into the second aggregated data collection 530, and, in this manner aggregate all of the subdivisions 320, 330 and 340.

As will be recognized by those skilled in the art, the combination of the distribute and aggregate commands 510 illustrated in FIG. 6 is the often used mapping command, whereby a collection of data, whose parts are the data segments 230, 240 and 250, is sorted according to some specified criteria. Therefore, in one embodiment, the combination of the distribute and aggregate core commands can be abstracted by a mapping command performing in accordance with the functional diagram 500 of FIG. 6. The forms of the map command can be analogous to the forms of the distribute command, described above. Specifically, the map command can enable a programmer to specify a file whose data is to be mapped, as indicated by the forms illustrated in Tables 13 and 15, below, or the map command can enable a programmer to specify the output of a prior command to act as the data to be mapped, as indicated by the forms illustrated in Tables 14 and 16, also below. The forms of the map command illustrated by Tables 15 and 16 can mirror the form illustrated by Tables 13 and 14, with the addition of the specification of a distribute delegate, described in detail above. Each of the forms, illustrated by Tables 13 through 16, further provide for the specification of a sorting option, enabling the programmer to indicate whether the output data, such as data collections 520, 530 and 540, of FIG. 6, are to be sorted.

TABLE 13

```
public MapScriptCommand Map (
    string cosmosFileName,
    int buckets,
    bool sort,
    string args)
```

TABLE 14

```
public MapScriptCommand Map (
    IScriptCommand dependency,
    int buckets,
    bool sort,
    string args)
```

TABLE 15

```
public MapScriptCommand Map (
    DistributeDelegate del,
    string cosmosFileName,
    int buckets,
    bool sort,
    string args)
```

TABLE 16

```
public MapScriptCommand Map (
    DistributeDelegate del,
    IScriptCommand dependency,
    int buckets,
    bool sort,
    string args)
```

While the aggregate command 410 can combine data from multiple data sets output by a single prior command, or stored in a file, in another embodiment, core commands can be provided for the combining of data from multiple sets where each set was the output of a prior command. Thus, such core commands would be able to combine the outputs of two or more prior commands.

Figure 7:
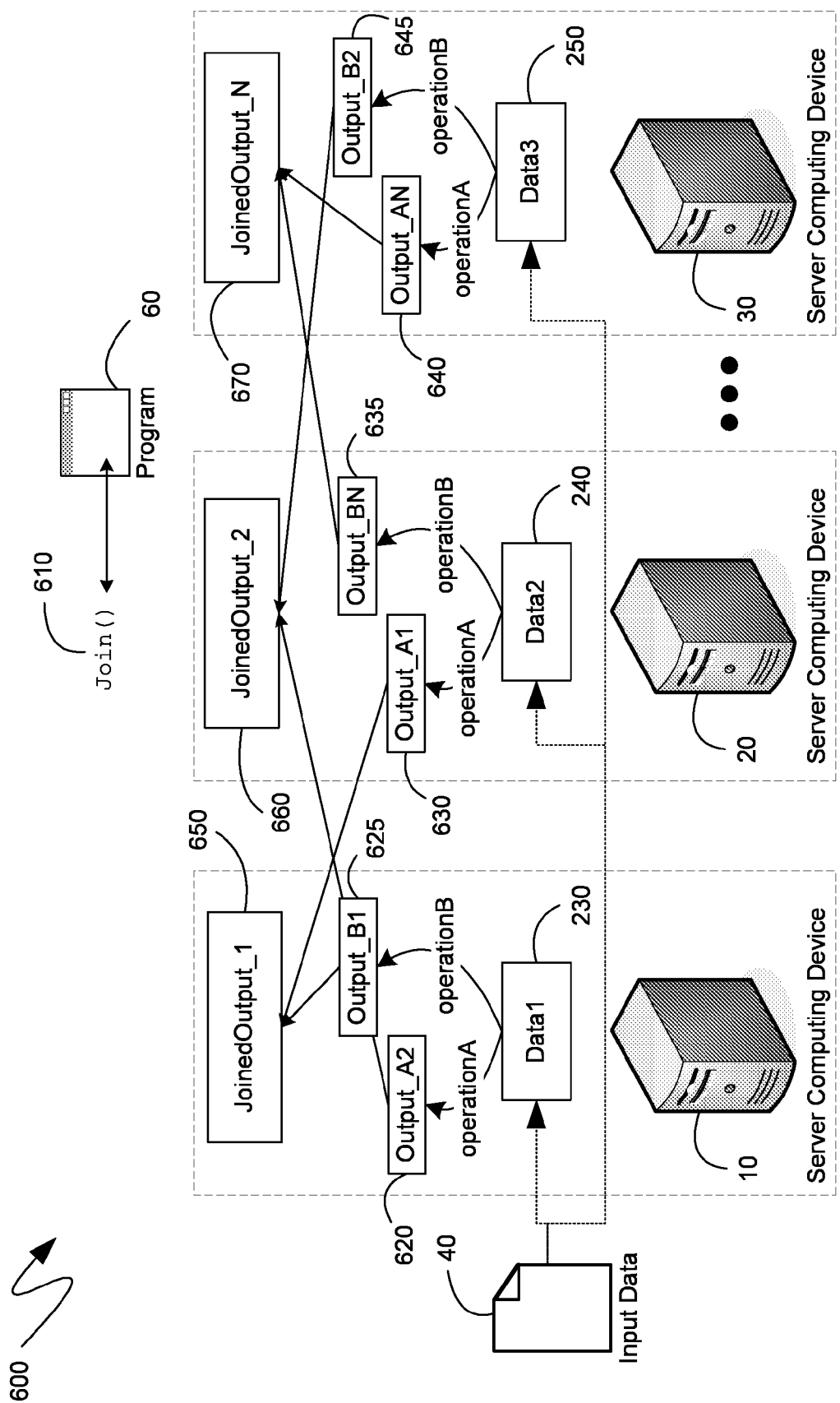
FIG. 7 is a block diagram of a "join" core command.

One such core command, illustrated by the functional diagram 600 of FIG. 7 can be the "join" core command. By using the join command 610 in the program 60, the programmer can cause the output of a first operation, previously performed and represented by output 620, 630 and 640, to be combined with the output of a second operation, also previously performed and represented by output 625, 635 and 645. More particularly, the results, termed "left" and "right", of the two prior operations are combined such that the primary "left" result is combined with the primary "right" result, the secondary "left" result is combined with the secondary "right" result, and continuing in such a manner until all the results have been combined. For example, as illustrated in FIG. 7, the primary output of the first operation 630 is combined with the primary output of the second operation 625, even though output 630 was generated by a different computing device than output 625. Similarly, the secondary output of the first operation 620 is combined with the secondary output of the second operation 645. Because of this pairing, in one embodiment, the join command is applicable to two prior operations that have the same number of results.

The determination of how the "left" and "right" outputs are to be ranked, in order to be combined appropriately by the join command 610, can be specified by the programmer via a join delegate, enabling the programmer to design and generate their own custom-tailored mechanism for determining which "left" output is combined with which "right" output. Alternatively, the programmer can utilize a default implementation, which can be appropriate for a wide variety of situations. Table 17, below, illustrates a form of the join command 610 according to one embodiment, whereby a default implementation can be used. Table 18, also below, illustrates a form of the join command 610 according to an alternative embodiment that enables the programmer to specify a join delegate. As can be seen, both forms can provide for the specification of the "left" and "right" inputs via the IScriptCommand exported by the objects that comprise the output of the two prior commands. In addition, both forms can provide for the specification of arguments, where appropriate. The form of Table 18, however, further provides for the specification of a join delegate, as indicated.

TABLE 17

```
public JoinScriptCommand Join (
    IScriptCommand left,
    IScriptCommand right,
    string args)
```

TABLE 18

```
public JoinScriptCommand Join (
    JoinDelegate del,
    IScriptCommand left,
    IScriptCommand right,
    string args)
```

In one embodiment, the join delegate can comprise a specification of a mechanism for obtaining the two outputs that are to be combined, a specification of a mechanism for generating the output that is the combination of the two inputs, and a provision for specifying arguments to be passed to the join delegate, if appropriate. Table 19, below, illustrates such a form according to one embodiment, where the input mechanisms and the output mechanism are instances of the StreamReader and StreamWriter classes, respectively.

TABLE 19

```
public delegate void JoinDelegate (
    StreamReader left,
    StreamReader right,
    StreamWriter writer,
    string [ ] args) ;
```

Another core command that can be provided for combining the output of two prior commands can be a "cross-product" core command that combines each data segment output by a first command with each data segment output by a second command. More specifically, a primary output of a first command could be combined with the primary output of a second command, the secondary output of the second command and, indeed, every output of the second command. Likewise, the secondary output of the first command could be combined with every output of the second command, with such combinations continuing for all of the outputs of the first command. Thus, the output segments produced by the cross-product core command can be equal to the product of the number of outputs of the first command and the number of outputs of the second command. Because of the nature of the combination performed by the cross-product core command, the number of outputs of the first and second commands do not need to be equal for the cross-product command to operate properly.

Figure 8:
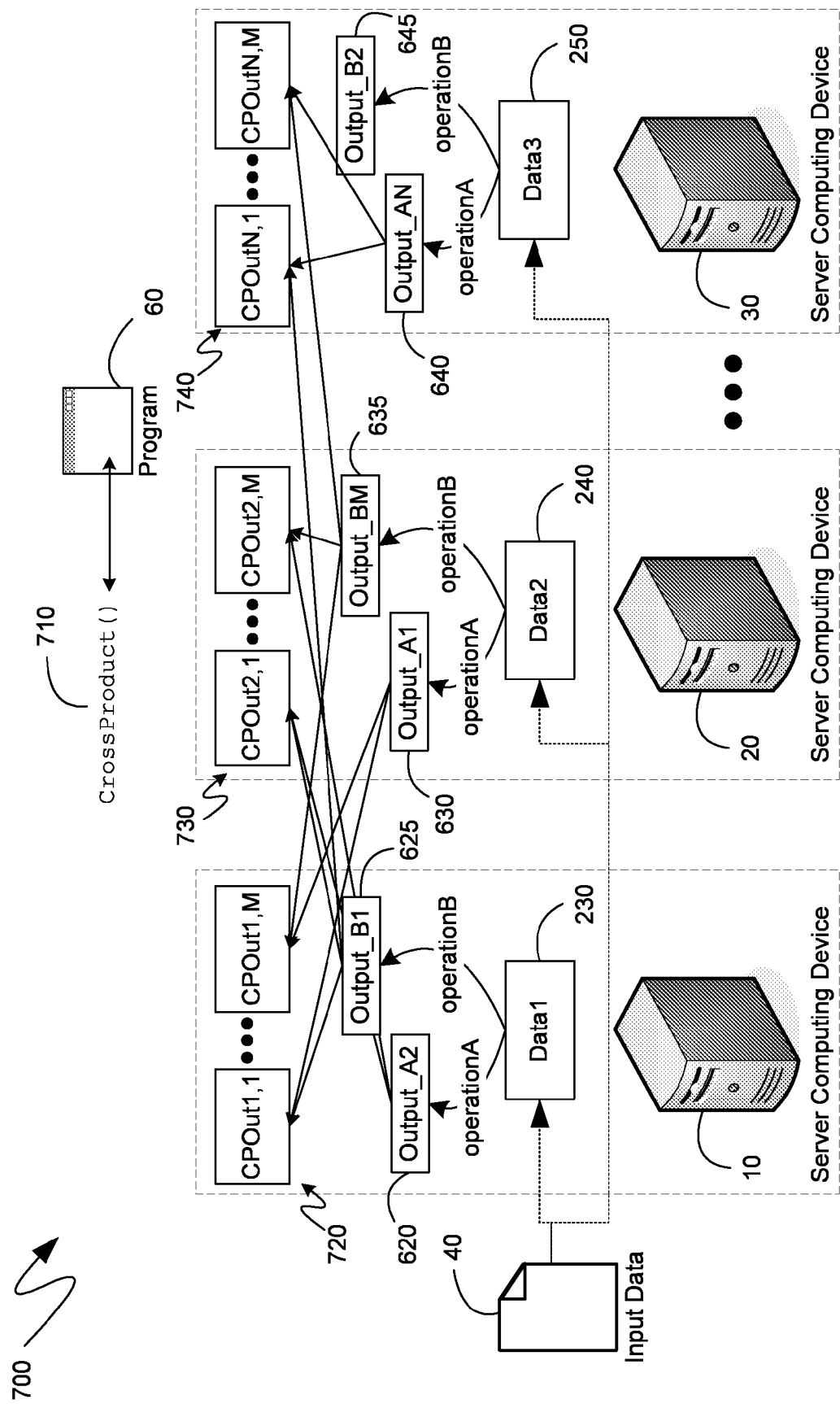
FIG. 8 is a block diagram of a "cross-product" core command.

Turning to FIG. 8, functional diagram 700 illustrates an exemplary operation of the cross-product command 710. Specifically, as in FIG. 7, a first operation can generate output 620, 630 and 640, while a second operation can generate output 625, 635 and 645. However, as shown in FIG. 8, the cross-product command 710 can result in the combination of the first output of the first operation 630 being combined, not only with the first output of the second operation 625, as shown, but also with the second output of the second operation 645, and with all of the other outputs of the second operation, generically represented by the block 635. Similarly, the second output of the first operation 620 can be combined with the first output of the second operation 625, as shown, the second output of the second operation 645, and with all of the other outputs of the second operation 635. The cross-product command 710, therefore, results in multiple outputs 720, multiple outputs 730 and multiple outputs 740 across the processors performing the cross-product command in parallel, such as the server computing devices 10, 20 and 30, respectively.

In one embodiment, the form of the cross-product command 710 can mirror that of the join command 610, described above. Specifically, as shown in Table 20, below, the cross-product command can be of a form that provides for the identification of the "left" and "right" results to be combined, as well as a join delegate to be used and, if appropriate, arguments to be passed in. The "left" and "right" results can be specified via the IScriptCommand interface exported by those result objects, as in the case of the join command 610, above, and the join delegate can be of the form previously described.

TABLE 20

```
public CrossProductScriptCommand CrossProduct (
    JoinDelegate del,
    IScriptCommand left,
    IScriptCommand right,
    string args)
```

In addition to the core commands described above, abstractions of the core commands can also be provided to enable easier access to commonly used versions of the core commands. One such abstraction can be the map command, described above, which abstracts a combination of the distribute and aggregate core commands. Another abstraction can be a "sort" command, which can be the process core command 210 used specifically to apply a sorting function in parallel. Such a sort command can mirror the form of the process core command 210, as shown in Table 2, above, with the exception that the sort command need not specify a process delegate. Specifically, the default process delegate for the sort command could be the sorting function itself. Consequently, the sort command can take the form illustrated in Table 21, below.

TABLE 21

```
public SortScriptCommand Sort (
    IScriptCommand dependency,
    string args)
```

Another abstraction of a core command can be a "merge" command, which can be the aggregate core command 410 used specifically to aggregate sorted results of a prior operation. Thus, the form of the merge command, illustrated below in Table 22, can mirror the form of the aggregate core command 410 shown above in Table 10. A further abstraction of the aggregate core command 410 can be the "output" command, which can aggregate the results of a prior operation into a file or other output destination. In one embodiment, the form of the output command, shown in Table 23, below, can mirror that of the aggregate core command 410 from Table 10, above, with the addition of the specification of an output destination.

TABLE 22

```
public AggregateScriptCommand Merge (
    IScriptCommand dependency,
    string args)
```

TABLE 23

```
public OutputScriptCommand Output (
    string cosmosFileName,
    IScriptCommand dependency)
```

Figure 9:
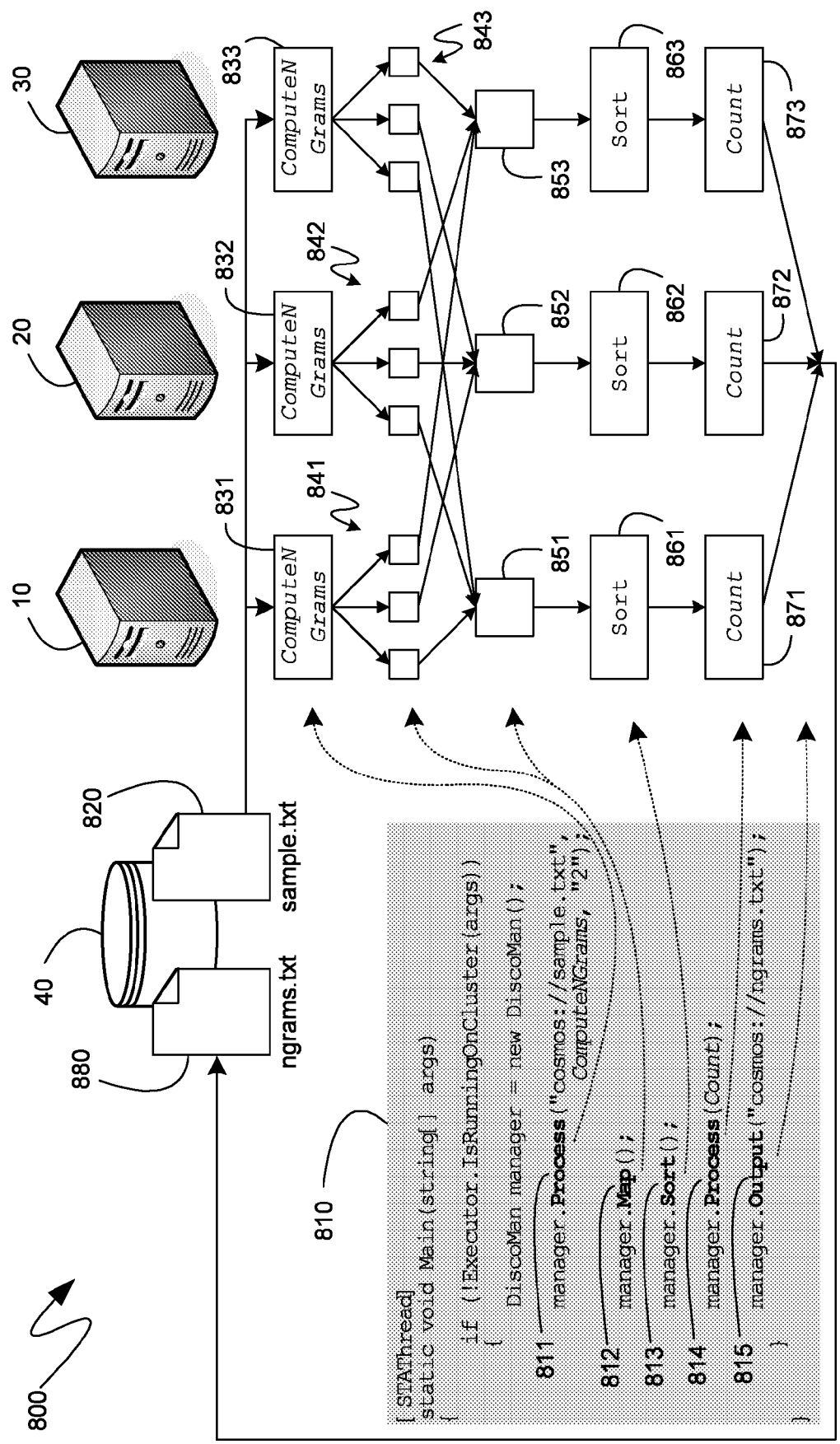
FIG. 9 is a block diagram illustrating the use of multiple core commands in sequence.

To further describe the core commands and aggregations, and illustrate their usage, an exemplary simple program 810 is provided as part of the functional diagram 800 of FIG. 9. The program 810 is written to take, as input, data from a file 820, entitled "sample.txt" in the illustrated example, perform some functions on this input data, and output the results to an output file 880, entitled "ngrams.txt" in the illustrated example. Because of the usage of the core commands and aggregations described above, a simple program, such as program 810, can be distributed across multiple processes, such as across server computing devices 10, 20 and 30, as illustrated in FIG. 9. Initially, as can be seen in the program 810, a manager, termed "DiscoMan" in the illustrated example, can be defined. The manager can provide the intelligence that accepts the above described core commands and aggregations, links them together in the manner specified by a program, such as program 810, and distributes them across multiple processes in a known, albeit complex, manner, thereby enabling programmers to generate programs capable of benefiting from the efficiencies of parallel-processing without requiring knowledge of the mechanisms traditionally used to enable code to be parallel-processed.

Subsequently, a process command 811 can be used, specifying, as input, data from the sample.txt file 820, and specifying that the function "ComputeNGrams" is to be applied to the data. The manager can, based on such a command, generate the appropriate instructions to cause the server computing devices 10, 20 and 30, for example, to apply the instances of the ComputeNGrams function 831, 832 and 833, respectively, to segments of the data obtained from the file 820.

The program 810 can, after the process command 811, specify a map command 812, which, as indicated previously, can be an aggregation of the distribute and aggregate core commands. The manager can, therefore, generate the appropriate instructions, in response to the map command 812, to cause the server computing devices 10, 20 and 30 to first distribute the results of the instances of the ComputeNGrams function 831, 832 and 833 into subsections 841, 842 and 843, respectively, and subsequently, to aggregate those subsections into sections 851, 852 and 853. The manager, therefore, can recognize, based on the order of the commands 811 and 812, that the default input for the map command 812 was the output of the process command 811, and can generate the underlying computing instructions appropriately.

The core commands described above, therefore, in one embodiment, use the most common scenario as their default values. In the case of inputs, for example, absent explicit specification from the programmer, which the core commands provide for, as explained above, the default input to a command will be the output of the prior command, and will be so specified by the manager. To maintain flexibility, however, the core command similarly enables a programmer to specify the input, should they desire to do so, as also explained above.

Subsequent to the mapping command 812, the exemplary program 810 of FIG. 9, specifies a sort command 813, which, as explained previously, can be a process command that applies a sorting function. Thus, the manager can generate the appropriate instructions to cause the server computing devices 10, 20 and 30 to apply instances of a sorting function 861, 862 and 863, respectively to the data 851, 852 and 853, respectively. Thus, again the manager applies, as the default input to the command 813, the output of the prior command 812.

The exemplary program 810 lists another process command 814, this time applying a function termed "Count," after the sorting command 813. The manager, therefore, can generate the instructions to cause the server computing devices 10, 20 and 30 to apply instances of the counting function 871, 872 and 873, respectively, to the output of the instances of the sorting function 861, 862 and 863, respectively. Lastly, the program 810 uses the output command 815 to aggregate the output of the instances of the counting function 871, 872 and 873 into the specified ngrams.txt file 880, causing the manager to generate the appropriate code for causing the server computing devices 10, 20 and 30 to do so.

The exemplary program 810 uses two process commands, namely commands 811 and 814, each of which specifies its own process delegate, namely the ComputeNGrams and the Count functions. FIG. 10 illustrates an example of the instructions of the ComputeNGrams function 910 and the Count function 920, illustrating how, while conforming to the process delegate form described in detail above, a programmer can generate functions that can be executed in a parallel manner.

In addition, to provide for the possibility that a programmer may wish to test their code on a single computing device or process before executing it in parallel, an embodiment of the manager can implement a method that checks whether the code to be generated will be executed in parallel. For example, program 810 of FIG. 9 invokes a method termed "IsRunningOnCluster", that can determine whether the code will be executed in parallel. If the code will be executed in parallel, it can be generated in the manner just described. However, if the code is being compiled for testing purposes on a single process, underlying mechanisms can take that into account and can generate code for a single process, as opposed to the distributed processes described.

As can be seen from the above descriptions, core commands and aggregations are provided for specific, fundamental operations to enable a programmer to easily generate programs that can benefit from parallel-processing without requiring the programmer to learn the complex mechanisms traditionally associated with parallel-processing. In view of the many possible variations of the subject matter described herein, we claim as our invention all such embodiments as may come within the scope of the following claims and equivalents thereto.

We claim:

1. A method for providing parallel-processing-capable commands, the method comprising the steps of:
   interpreting a process command, specifying at least a process delegate function and process input data, to generate computer-executable instructions for applying, in parallel across one or more processes, the process delegate function to the process input data to generate a process output data;
   interpreting a distribute command, specifying at least a distribute input data, to generate computer-executable instructions for dividing, in parallel across one or more processes, the distribute input data into two or more subdivisions representing a distribute output data;
   interpreting an aggregate command, specifying multiple aggregate input data, to generate computer-executable instructions for combining, in parallel across one or more processes, the multiple aggregate input data into an aggregate output data;
   interpreting a join command, specifying a first and second join input data, both having an equivalent number of segments, to generate computer-executable instructions for combining, in parallel across one or more processes, each segment of the first join input data with a corresponding segment of the second join input data to form a join output data; and
   interpreting a cross-product command, specifying a first and second cross-product input data, to generate computer-executable instructions for combining, in parallel across one or more processes, each segment of the first cross-product input data with each segment of the second cross-product input data to form a cross-product output data.

2. The method of claim 1, wherein the generated computer-executable instructions for dividing the distribute input data are generated in accordance with a distribute delegate if the distribute command specifies the distribute delegate; wherein the generated computer-executable instructions for combining the multiple aggregate input data are generated in accordance with an aggregate delegate if the aggregate command specifies the aggregate delegate; and wherein the generated computer-executable instructions for combining each segment of the first join input data with the corresponding segment of the second join input data are generated in accordance with a join delegate if the join command specifies the join delegate.

3. The method of claim 1 further comprising the steps of interpreting abstractions of the process command, the distribute command, the aggregate command, the join command, or the cross-product command, which perform specific, commonly used operations.

4. The method of claim 1, wherein the generated computer-executable instructions for combining the multiple aggregate input data comprise computer-executable instructions for combining each subdivision of the multiple aggregate input data in one process with a corresponding subdivision of the multiple aggregate input data in at least one other process if the aggregate command follows the distribute command such that the two or more subdivisions output by the distribute command comprise the multiple aggregate input data.

5. The method of claim 1, wherein the interpreting of at least one of the process, distribute, aggregate, join or cross-product commands comprises identifying at least one of the process input data, the distribute input data, the multiple aggregate input data, the first and second join input data, and the first and second cross-product input data as output data of a preceding command if the at least one of the process input data, the distribute input data, the multiple aggregate input data, the first and second join input data, and the first and second cross-product input data is not explicitly specified.

6. The method of claim 1 further comprising the steps of detecting whether a program comprising at least one of the process, distribute, aggregate, join or cross-product commands is to be executed across multiple processes, and interpreting the at least one of the process, distribute, aggregate, join or cross-product commands to generate computer-executable instructions for execution in parallel across multiple processes if the detecting indicates that the program is to be executed across multiple processes.

7. The method of claim 1, wherein the process output data, the distribute output data, the aggregate output data, the join output data, and the cross-product output data export an interface comprising an identifier, a number of processes and a method describing how the object should be generated.

8. The method of claim 7, wherein the process input data, the distribute input data, the multiple aggregate input data, the first and second join input data, and the first and second cross-product input data are specified by reference to the interface.

9. One or more computer-readable storage media comprising computer-executable instructions for providing parallel-processing-capable commands, the computer-executable instructions directed to steps comprising:
    interpreting a process command, specifying at least a process delegate function and process input data, to generate computer-executable instructions for applying, in parallel across one or more processes, the process delegate function to the process input data to generate a process output data;
    interpreting a distribute command, specifying at least a distribute input data, to generate computer-executable instructions for dividing, in parallel across one or more processes, the distribute input data into two or more subdivisions representing a distribute output data;
    interpreting an aggregate command, specifying multiple aggregate input data, to generate computer-executable instructions for combining, in parallel across one or more processes, the multiple aggregate input data into an aggregate output data;
    interpreting a join command, specifying a first and second join input data, both having an equivalent number of segments, to generate computer-executable instructions for combining, in parallel across one or more processes, each segment of the first join input data with a corresponding segment of the second join input data to form a join output data; and
    interpreting a cross-product command, specifying a first and second cross-product input data, to generate computer-executable instructions for combining, in parallel across one or more processes, each segment of the first cross-product input data with each segment of the second cross-product input data to form a cross-product output data.

10. The computer-readable storage media of claim 9, wherein the generated computer-executable instructions for dividing the distribute input data are generated in accordance with a distribute delegate if the distribute command specifies the distribute delegate; wherein the generated computer-executable instructions for combining the multiple aggregate input data are generated in accordance with an aggregate delegate if the aggregate command specifies the aggregate delegate; and wherein the generated computer-executable instructions for combining each segment of the first join input data with the corresponding segment of the second join input data are generated in accordance with a join delegate if the join command specifies the join delegate.

11. The computer-readable storage media of claim 9 comprising further computer-executable instructions directed to interpreting abstractions of the process command, the distribute command, the aggregate command, the join command, or the cross-product command, which perform specific, commonly used operations.

12. The computer-readable storage media of claim 9, wherein the generated computer-executable instructions for combining the multiple aggregate input data comprise computer-executable instructions for combining each subdivision of the multiple aggregate input data in one process with a corresponding subdivision of the multiple aggregate input data in at least one other process if the aggregate command follows the distribute command such that the two or more subdivisions output by the distribute command comprise the multiple aggregate input data.

13. The computer-readable storage media of claim 9, wherein the interpreting of at least one of the process, distribute, aggregate, join or cross-product commands comprises identifying at least one of the process input data, the distribute input data, the multiple aggregate input data, the first and second join input data, and the first and second cross-product input data as output data of a preceding command if the at least one of the process input data, the distribute input data, the multiple aggregate input data, the first and second join input data, and the first and second cross-product input data is not explicitly specified.

14. The computer-readable storage media of claim 9 comprising further computer-executable instructions directed to detecting whether a program comprising at least one of the process, distribute, aggregate, join or cross-product commands is to be executed across multiple processes, and interpreting the at least one of the process, distribute, aggregate, join or cross-product commands to generate computer-executable instructions for execution in parallel across multiple processes if the detecting indicates that the program is to be executed across multiple processes.

15. The computer-readable storage media of claim 9, wherein the process output data, the distribute output data, the aggregate output data, the join output data, and the cross-product output data export an interface comprising an identifier, a number of processes and a method describing how the object should be generated.

16. The computer-readable storage media of claim 15, wherein the process input data, the distribute input data, the multiple aggregate input data, the first and second join input data, and the first and second cross-product input data are specified by reference to the interface.

17. One or more computer-readable storage media comprising a library of computer-interpretable commands for generating a program that can be executed across multiple processes, the library comprising:
- a process command for applying a process delegate function to a process input data in parallel across one or more processes to generate a process output data;
- a distribute command for dividing a distribute input data into two or more subdivisions in parallel across one or more processes to present a distribute output data;
- an aggregate command for combining multiple aggregate input data in parallel across one or more processes into an aggregate output;
- a join command for combining each segment of a first join input data with a corresponding segment of a second join input data in parallel across one or more processes to form a join output data; and
- a cross-product command for combining each segment of a first cross-product input data with each segment of a second cross-product input data in parallel across one or more processes to form a cross-product output data.

18. The computer-readable storage media of claim 17 further comprising computer-executable instructions for interpreting the process command, the distribute command, the aggregate command, the join command, and the cross-product command to provide, as input to one command, the output of a preceding command.

19. The computer-readable storage media of claim 17, wherein the distribute command can specify a distribute delegate informing the dividing of the distribute input data; wherein the aggregate command can specify an aggregate delegate informing the combining the multiple aggregate input data; and wherein the join command can specify a join delegate informing the combining the each segment of the first join input data with the corresponding segment of the second join input data.

20. The computer-readable storage media of claim 17, wherein at least one of the process input data, the distribute input data, the multiple aggregate input data, the first and second join input data, and the first and second cross-product input data is identified via an interface exported by the data comprising an identifier, a number of processes and a method describing how the data should be generated.

* * * * *